United States Patent
Watanabe et al.

(10) Patent No.: US 10,135,046 B2
(45) Date of Patent: Nov. 20, 2018

(54) TEMPERATURE REGULATION STRUCTURE

(71) Applicant: TOYOTA JIDOSHA KABUSHIKI KAISHA, Toyota-shi, Aichi-ken (JP)

(72) Inventors: Hirotaka Watanabe, Toyota (JP); Tuyoshi Hayashi, Miyoshi (JP); Junta Katayama, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 114 days.

(21) Appl. No.: 14/648,555

(22) PCT Filed: Nov. 30, 2012

(86) PCT No.: PCT/JP2012/007715
§ 371 (c)(1),
(2) Date: May 29, 2015

(87) PCT Pub. No.: WO2014/083599
PCT Pub. Date: Jun. 5, 2014

(65) Prior Publication Data
US 2015/0303420 A1     Oct. 22, 2015

(51) Int. Cl.
| | | |
|---|---|---|
| *H01M 10/6566* | (2014.01) |
| *H01M 2/10* | (2006.01) |
| *H01M 10/6563* | (2014.01) |
| *H01M 10/6552* | (2014.01) |
| *H01M 10/34* | (2006.01) |
| *H01M 10/625* | (2014.01) |

(52) U.S. Cl.
CPC ..... *H01M 2/1077* (2013.01); *H01M 10/6552* (2015.04); *H01M 10/6563* (2015.04);
(Continued)

(58) Field of Classification Search
CPC .......... H01M 2/1077; H01M 10/6563; H01M 10/6552; H01M 10/6566; H01M 2220/20;
(Continued)

(56) References Cited

U.S. PATENT DOCUMENTS

| | | |
|---|---|---|
| 6,761,992 B1 | 7/2004 | Marukawa et al. |
| 2002/0028375 A1 | 3/2002 | Morishita et al. |

(Continued)

FOREIGN PATENT DOCUMENTS

| | | |
|---|---|---|
| CN | 2842750 Y | 11/2006 |
| JP | 10-106637 A | 4/1998 |

(Continued)

*Primary Examiner* — Christina Chern
(74) *Attorney, Agent, or Firm* — Sughrue Mion, PLLC

(57) ABSTRACT

In a temperature regulation structure according to the invention, the power storage element includes a power generation element for charging and discharging, and has a case body having an opening portion for incorporating the power generation element, and a lid that closes up the opening portion of the case body. Air for temperature regulation that comes into contact with the power storage element is supplied from a direction substantially perpendicular to a bottom face of the case body, which is opposed to the lid across the power generation element. The temperature of the power storage element can be efficiently regulated by bringing the air for temperature regulation into contact with the bottom face of the case body.

9 Claims, 11 Drawing Sheets

(52) U.S. Cl.
CPC ...... *H01M 10/6566* (2015.04); *H01M 10/345* (2013.01); *H01M 10/625* (2015.04); *H01M 2220/20* (2013.01)

(58) Field of Classification Search
CPC .... H01M 2/12; H01M 2/1252; H01M 2/1294; H01M 10/65; H01M 10/655; H01M 10/6551; H01M 10/6554; H01M 10/6556; H01M 10/6557
USPC .............................................. 429/53, 72, 83
See application file for complete search history.

(56) References Cited

U.S. PATENT DOCUMENTS

| | | | | |
|---|---|---|---|---|
| 2009/0320715 | A1* | 12/2009 | Morita | B60K 1/04 105/51 |
| 2010/0285347 | A1* | 11/2010 | Saito et al. | H01M 2/1077 429/120 |
| 2011/0206967 | A1 | 8/2011 | Itsuki | |
| 2012/0009446 | A1* | 1/2012 | Mizuguchi | H01M 2/1077 429/71 |

FOREIGN PATENT DOCUMENTS

| | | |
|---|---|---|
| JP | 2001-068081 A | 3/2001 |
| JP | 2006-185788 A | 7/2006 |
| JP | 2009-301877 A | 12/2009 |
| JP | 2010-015788 A | 1/2010 |
| JP | 2010-173536 A | 8/2010 |
| JP | 2010-192207 A | 9/2010 |
| JP | 2010-277863 A | 12/2010 |
| JP | 2011-023296 A | 2/2011 |
| JP | 2011-181224 A | 9/2011 |
| JP | 2012-109126 A | 6/2012 |
| JP | 2012155867 A | 8/2012 |
| JP | 2012164463 A | 8/2012 |
| JP | 2012169108 A | 9/2012 |

* cited by examiner

TEMPERATURE REGULATION STRUCTURE

TECHNICAL FIELD

The invention relates to a temperature regulation structure for a power storage element.

BACKGROUND ART

A battery can be constituted of, for example, a case body that accommodates a power generation element for charging and discharging, and a lid that covers an opening of the case body. In cooling the battery, a cooling medium (e.g., cooling air) can be brought into contact with the lid on the upper side of the battery and a bottom face of the case body on the lower side of the battery.

RELATED ART DOCUMENTS

Patent Documents

Patent Document 1: Japanese Patent Application Publication No. 2010-173536 (JP 2010-173536 A)
Patent Document 2: Japanese Patent Application Publication No. 2012-109126 (JP 2012-109126 A)
Patent Document 3: Japanese Patent Application Publication No. 2009-301877 (JP 2009-301877 A)
Patent Document 4: Japanese Patent Application Publication No. 2010-015788 (JP 2010-015788 A)
Patent Document 5: Japanese Patent Application Publication No. 2010-192207 (JP 2010-192207 A)
Patent Document 6: Japanese Patent Application Publication No. 2010-277863 (JP 2010-277863 A)
Patent Document 7: Japanese Patent Application Publication No. 2011-023296 (JP 2011-023296 A)
Patent Document 8: Japanese Patent Application Publication No. 2011-181224 (JP 2011-181224 A)

SUMMARY OF THE INVENTION

Problem to be Solved by the Invention

However, in the case where the cooling medium is brought into contact with the lid on the upper side of the battery to cool the battery, the lid is configured separately from the case body with which the power generation element is in contact. Therefore, high thermal resistance leads to a problem of low cooling efficiency.

On the other hand, the bottom face of the case body with which the power generation element is in contact has lower thermal resistance than the lid, so it is conceivable to bring the cooling medium into contact with the bottom face on the lower side of the battery to cool the battery. However, it is difficult to efficiently cool the battery simply by bringing the cooling medium into contact with the bottom face of the case body (e.g., Patent Document 1).

It is an object of the invention to provide a temperature regulation structure that makes it possible to efficiently regulate the temperature of a power storage element that is constituted of a lid and a case body that accommodates a power generation element for charging and discharging, by bringing air for temperature regulation into contact with a bottom face of the case body, which is opposed to the lid across the power generation element.

Means for Solving the Problem

In a temperature regulation structure for a power storage element according to the invention, the power storage element has a case body that accommodates a power generation element for charging and discharging and that has an opening portion for incorporating the power generation element, and a lid that closes up the opening portion of the case body. Then, air for temperature regulation that comes into contact with the power storage element is supplied from a direction substantially perpendicular to a bottom face of the case body that is opposed to the lid across the power generation element.

According to the invention, the air for temperature regulation that comes into contact with the power storage element is supplied from the direction substantially perpendicular to the bottom face of the case body constituting the power storage element. Therefore, the temperature of the power storage element can be efficiently regulated by bringing the air for temperature regulation into contact with the bottom face of the case body.

The power storage element is configured such that a first length of the power storage element in a direction in which the lid and the bottom face are opposed to each other is shorter than a second length of the power storage element in a direction perpendicular to the first length.

The temperature regulation structure further has a guide member having a supply passage that guides the air to the bottom face, and a guide face that guides the air flowing in from the supply passage to exchange heat with the bottom face, outward along the bottom face.

The guide member may have an exhaust passage that is provided in a manner partitioned from the supply passage at a position adjacent to the supply passage and that discharges the air exchanging heat with the bottom face.

The guide face is configured to guide the air flowing in from the supply passage to exchange heat with the bottom face, toward the exhaust passage that is adjacent to the supply passage along the bottom face.

The exhaust passage is configured to be arranged on each of both sides of the supply passage via the guide face.

The supply passage is configured to guide the air substantially perpendicularly to a direction toward the bottom face, and the exhaust passage is configured to guide the air flowing in via the guide face, in a direction away from the bottom face.

The supply passage, the guide face, and the exhaust passage are provided in a manner corresponding to the bottom face, and suction and discharge of the air against the power storage element is carried out for the single bottom face.

The guide member can have an installation portion that is arranged on the bottom face side with respect to the guide face and with which part of the bottom face for forming a space through which the air flows between the guide face and the bottom face is in contact.

The supply passage extends in a first direction of the bottom face, and is formed such that a width of the supply passage in a second direction that is perpendicular to the first direction narrows as a distance to the bottom face decreases.

The temperature regulation structure can be configured as a temperature regulation structure in which the air is supplied from a direction substantially perpendicular to the bottom face of each of a plurality of power storage elements, in a power storage device in which the plurality of the power storage elements are arranged side by side in a predetermined direction.

The temperature regulation structure can have a guide member having a supply passage and a guide face and that is provided to a corresponding bottom face of each of the power storage elements. The supply passage guides the air to the bottom face. The guide face guides the air flowing in from the supply passage to exchange heat with the bottom face, outward along the bottom face.

The supply passage extends in a length direction of the bottom face that is perpendicular to the predetermined direction, and the guide face is configured to guide the air exchanging heat with the bottom face, in a width direction of the bottom face that is perpendicular to the length direction, along the bottom face.

The guide face is configured to guide the air exchanging heat with the bottom face in the length direction, along the bottom face.

The guide member has an exhaust passage that is provided in a manner partitioned from the supply passage at a position adjacent to the supply passage and that discharges the air exchanging heat with the bottom face. The temperature regulation structure can have an intake path for the air, and an exhaust path that is provided in a manner partitioned from the intake path at a position perpendicular to the predetermined direction across the intake path and that is communicated with the exhaust passage.

A space between two of the power storage elements that are adjacent to each other in the predetermined direction is closed up by an insulating layer.

The lid may have an electrode terminal that is electrically connected to the power generation element, and an exhaust portion that discharges a gas generated in the case body to an outside.

MODES FOR CARRYING OUT THE INVENTION

The embodiments of the invention will be described hereinafter.

First Embodiment

Figure 1:
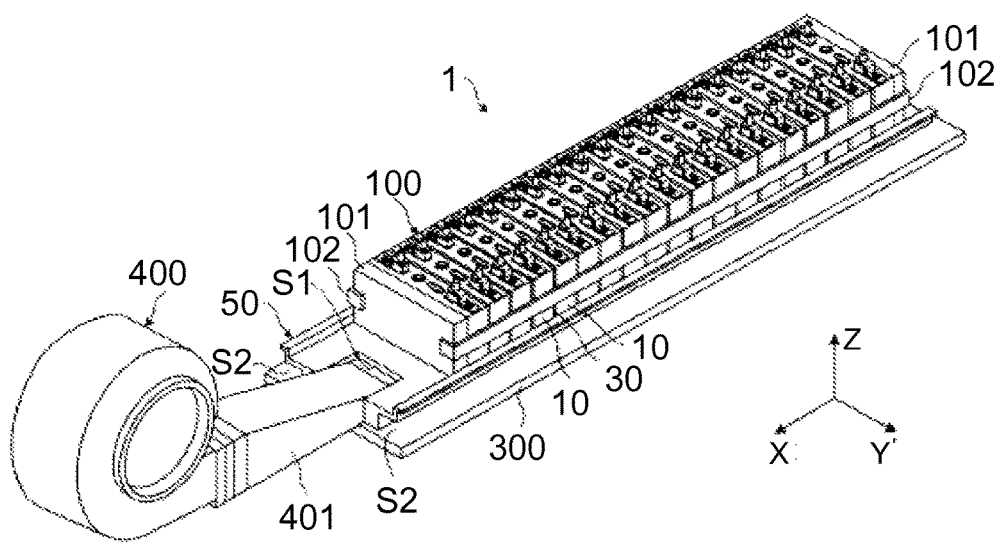
FIG. 1 is a schematic perspective view showing an example of a temperature regulation structure for a battery pack in a first embodiment of the invention.

FIGS. 1 to 20 are views showing the first embodiment of the invention. FIG. 1 is a schematic perspective view showing an example of a temperature regulation structure for a battery pack. In FIG. 1, an X-axis, a Y-axis, and a Z-axis are axes that are perpendicular to one another. The same relationship among the X-axis, the Y-axis, and the Z-axis holds true for the other drawings. In the present embodiment of the invention, the Z-axis is an axis equivalent to the vertical direction.

A battery pack 1 can be mounted in a vehicle. The battery pack 1 is fixed to a floor panel (a body) of the vehicle, and can be arranged, for example, in a space below a seat such as a front seat, a rear seat or the like in a vehicle interior, a space between front seats, a luggage space located behind the rear seat, or the like.

The battery pack 1 outputs energy that is used to cause the vehicle to run. The vehicle may be a hybrid vehicle or an electric vehicle. The hybrid vehicle is a vehicle that has an another dynamic source such as a fuel cell or an internal combustion engine in addition to the battery pack 1, as a dynamic source for causing the vehicle to run. The electric vehicle is a vehicle that is equipped only with the battery pack 1 as a dynamic source of the vehicle.

The battery pack 1 is connected to a motor-generator. The motor-generator receives power from the battery pack 1, and can thereby produce kinetic energy for causing the vehicle to run. The motor-generator is connected to a wheel. The kinetic energy produced by the motor-generator is transmitted to the wheel. In decelerating or stopping the vehicle, the motor-generator converts the kinetic energy generated in braking the vehicle into electric energy. The electric energy produced by the motor-generator can be stored in the battery pack 1.

A DC/DC converter and an inverter can be arranged in a current path between the battery pack 1 and the motor-generator. The use of the DC/DC converter makes it possible to step up an output voltage of the battery pack 1 and supply the motor-generator therewith, and to step down the voltage from the motor-generator and supply the battery pack 1 therewith. Besides, the use of the inverter makes it possible to convert a DC power output from the battery pack 1 intro an AC power. An AC motor can be used as the motor-generator.

Figure 2:
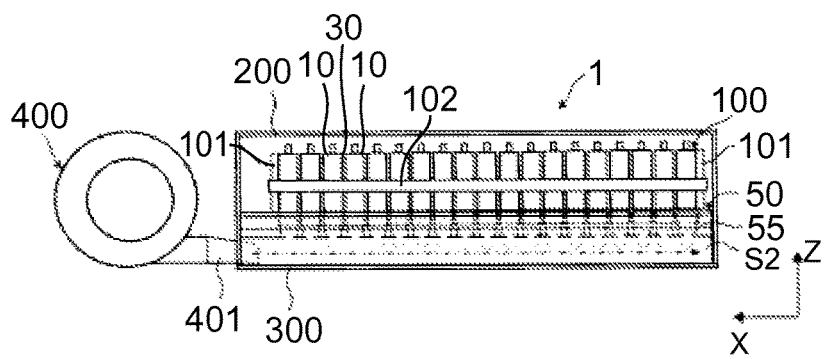
FIG. 2 is a schematic lateral view of the battery pack in the first embodiment of the invention.

FIG. 2 is a schematic lateral view of the battery pack 1 of the present embodiment of the invention. The battery pack 1 has an upper case 200 and a lower case 300. An assembled battery 100 is arranged, together with guide members 50, in an accommodation space that is surrounded by the upper case 200 and the lower case 300.

As shown in FIGS. 1 and 2, the assembled battery 100 is equivalent to the power storage device of the invention. The assembled battery 100 has a plurality of electric cells 10. The plurality of the electric cells 10 are aligned in a predetermined direction (an X-direction). Each of the electric cells 10 is equivalent to the power storage element of the invention. The plurality of the electric cells 10 are electrically connected in series to one another by a bus bar. Incidentally, the assembled battery 100 may include the plurality of the electric cells 10 that are electrically connected in parallel to one another.

A secondary battery such as a nickel hydride battery or a lithium-ion battery can be used as each of the electric cells 10. Besides, an electric double layer capacitor (a capacitor) can also be used instead of the secondary battery.

In the present embodiment of the invention, the plurality of the electric cells 10 are aligned in one direction, but the invention should not be limited thereto. Specifically, a single battery module can be constituted by two or more electric cells, and a plurality of such battery modules can be aligned in the X-direction. A plurality of electric cells that are included in a single battery module can be electrically connected in series to one another.

A pair of end plates 101 are arranged at both ends of the assembled battery 100 in an arrangement direction (the X-direction) in which the plurality of the electric cells 10 are arranged side by side, respectively. The pair of the end plates 101 sandwich the plurality of the electric cells 10 constituting the assembled battery 100, and are used to apply a binding force to the plurality of the electric cells 10. The binding force is a force that sandwiches the electric cells 10 in the X-direction. By applying the binding force to the electric cells 10, the electric cells 10 can be restrained from expanding, and the input and output characteristics of the electric cells 10 can be restrained from deteriorating.

Specifically, both ends of a binding band 102 that extends in the X-direction are connected to the pair of the end plates 101 respectively. Thus, the pair of the end plates 101 can apply the binding force to the plurality of the electric cells 10. The binding band 102 is arranged on each of right and left lateral faces (lateral faces in the Y-direction) of the assembled battery 100. The positions of arrangement of binding bands 102 and the number of binding bands 102 can be appropriately set. It is only required that both the ends of each of the binding bands 102 be connected to the pair of the end plates 101 respectively. For example, the binding band 102 can be arranged on an upper face of the assembled battery 100 in the Z-direction.

Insulating members 30 (which are equivalent to the insulating layer of the invention) are provided between the electric cells 10 that are arranged side by side in the X-direction. Each of the insulating members 30 is in contact with lateral faces 10c that is perpendicular to the direction of arrangement of the electric cells 10, and electrically insulates corresponding ones of the electric cells 10 from each other. In the present embodiment of the invention, the space between two of the electric cells 10 that are arranged adjacent to each other is closed up by a corresponding one of the insulating members 30, and no space through which air for temperature regulation flows is provided. The respective electric cells 10 constituting the assembled battery 100 of the present embodiment of the invention are arranged close to one another via the insulating members 30 respectively, in the direction of arrangement.

A blower 400 supplies air for temperature regulation into the battery pack 1. The blower 400 is arranged adjacent to the assembled battery 100 in the X-direction. That is, the blower 400 is arranged adjacent to the direction in which the plurality of the electric cells 10 of the assembled battery 100 are arranged side by side.

An intake duct 401 is connected to an outlet port of the blower 400. The intake duct 401 is arranged between the assembled battery 100 and the blower 400, and is connected to an intake path S1 that is formed below the assembled battery 100. The blower 400 takes in the air in the vehicle interior from an intake port (an inlet port) facing the vehicle interior by driving a blower motor, and supplies this air as a temperature regulation medium to the intake path S1 of the battery pack 1 through the intake duct 401.

Incidentally, the blower 400 may not be arranged side by side with the assembled battery 100 in the X-direction. For example, the blower 400 can also be arranged side by side with the assembled battery 100 in the Y-direction. In this case, the blower 400 can be configured in any shape such that the outlet port of the blower 400 and the intake duct 401 are connected to an end portion of the intake path S1 extending in the X-direction.

Air for temperature regulation comes into contact with outer faces of the electric cells 10, and heat is exchanged between the air and the electric cells 10. For example, when the electric cells 10 generate heat by being charged and discharged etc., the temperature of the electric cells 10 can be restrained from rising by bringing cooling air into contact with the electric cells 10. Besides, when the electric cells 10 are excessively cooled, the temperature of the electric cells 10 can be restrained from falling by bringing humidifying air into contact with the electric cells 10.

The temperature of the air in the vehicle interior is suited to regulate the temperature of the electric cells 10, owing to an air-conditioner that is mounted in the vehicle, or the like. Accordingly, when the air in the vehicle interior is supplied to the electric cells 10, the temperature of the electric cells 10 can be regulated. The input and output characteristics of the electric cells 10 can be restrained from deteriorating, by regulating the temperature of the electric cells 10.

Figure 3:
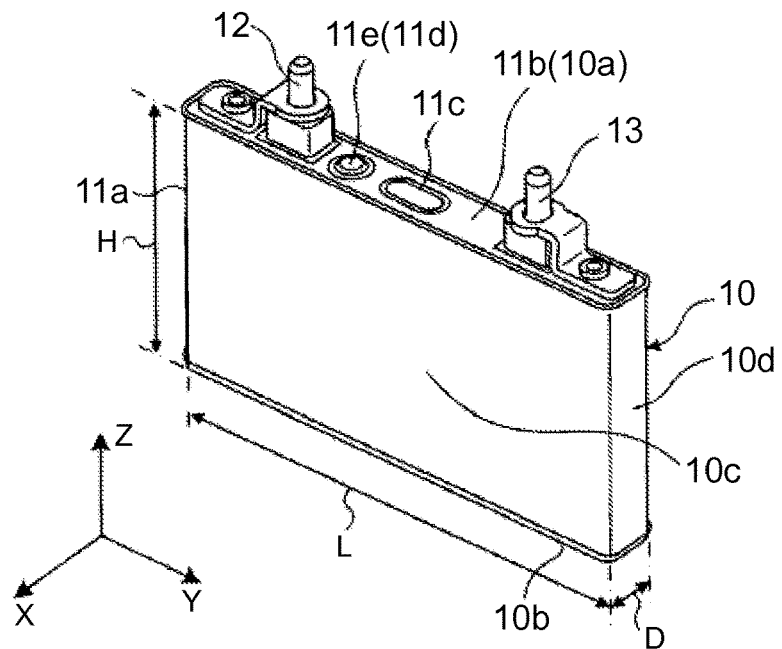
FIG. 3 is an outside perspective view of an electric cell in the first embodiment of the invention.
Figure 4:
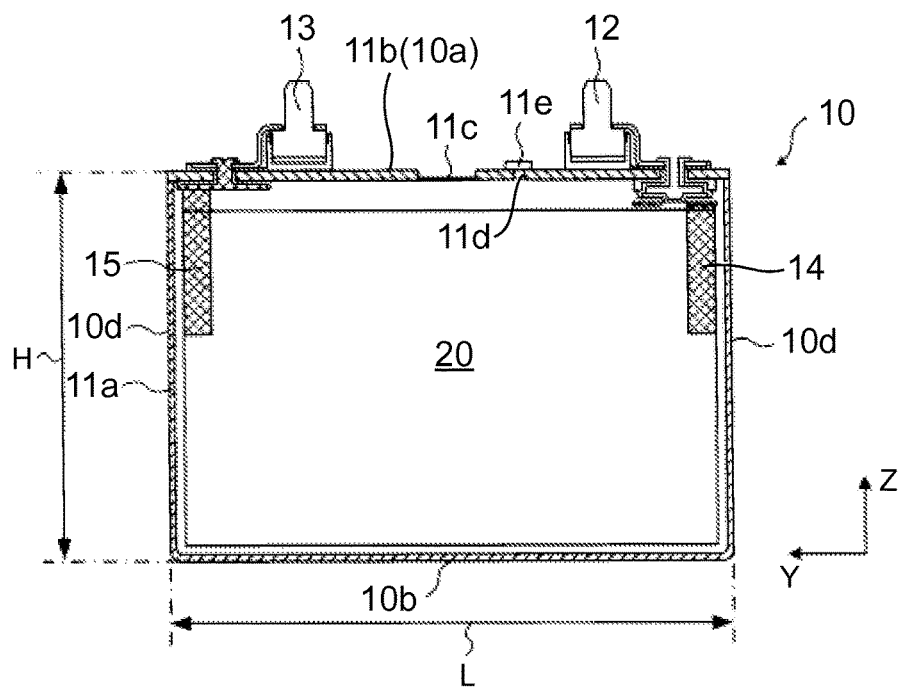
FIG. 4 is a view showing an internal structure of the electric cell in the first embodiment of the invention.

FIG. 3 is an outside perspective view of the electric cell 10. FIG. 4 is a view showing an internal structure of the electric cell 10. The electric cell 10 has a battery case 11, and a power generation element 20 that is accommodated in the battery case 11. The electric cell 10 is a so-called square battery. The battery case 11 is formed in the shape of a rectangular parallelepiped. The battery case 11 can be formed of, for example, a metal, and has a case body 11a and a lid 11b. The case body 11a has an opening portion for incorporating the power generation element 20. The lid 11b closes up the opening portion of the case body 11a. Thus, the interior of the battery case 11 is sealed. The lid 11b and the case body 11a can be fixed to each other by, for example, welding.

A positive electrode terminal 12 and a negative electrode terminal 13 are fixed to the lid 11b. The positive electrode terminal 12 is electrically connected to a positive electrode collector 14 that is accommodated in the battery case 11. The positive electrode collector 14 is electrically connected to the power generation element 20. The negative electrode terminal 13 is electrically connected to a negative electrode collector 15 that is accommodated in the battery case 11. The negative electrode collector 15 is electrically connected to the power generation element 20.

The lid 11b is provided with a valve 11c. The valve 11c is used to discharge gas to the outside of the battery case 11 when gas is generated inside the battery case 11. Specifically, when the internal pressure of the battery case 11 reaches an operating pressure of the valve 11c as a result of the generation of gas, the valve 11c changes from its closed state to its open state, thereby discharging gas to the outside of the battery case 11.

In the present embodiment of the invention, the valve 11c is a so-called destruction-type valve, and is configured by engraving the lid 11b. Incidentally, a so-called return-type valve can also be used as the valve 11c. The return-type valve reversibly changes between its closed state and its open state, in accordance with the relationship in height between the internal pressure of the battery case 11 and the external pressure (the atmospheric pressure).

A liquid injection port 11d is formed through the lid 11b at a position adjacent to the valve 11c. The liquid injection port 11d is used to inject electrolytic solution into the battery case 11. It should be noted herein that the lid 11b is fixed to the case body 11a after the power generation element 20 is accommodated in the case body 11a. In this state, electrolytic solution is injected into the battery case 11 from the liquid injection port 11d. After electrolytic solution is injected into the battery case 11, the liquid injection port 11d is closed up by a liquid injection tap 11e.

The power generation element 20 has a positive electrode element, a negative electrode element, and a separator that is arranged between the positive electrode element and the negative electrode element. The positive electrode element has a collector plate, and a positive electrode active material layer that is formed on a surface of the collector plate. The negative electrode element has a collector plate, and a negative electrode active material layer that is formed on a surface of the collector plate. The separator, the positive electrode active material layer, and the negative electrode active material layer are impregnated with electrolytic solution. Incidentally, solid electrolyte can also be used instead of electrolytic solution.

Incidentally, in the electric cell 10 of the present embodiment of the invention, the lid 11b, which covers an opening of the case body 11a and is provided with the positive electrode terminal 12 and the negative electrode terminal 13, is an upper face 10a of the electric cell 10, and a lower face of the case body 11a that is opposed to the lid 11b across the power generation element 20 in the Z-direction is a bottom face 10b. Besides, faces that are perpendicular to the direction of arrangement of the electric cell 10 and that faces the other electric cell 10 that is adjacent thereto via the insulating member 30 is first lateral faces 10c, and lateral faces that are located on both sides of the electric cell 10 in the Y-direction are second lateral faces 10d.

Besides, the electric cell 10 of the present embodiment of the invention is formed to be long in the Y-direction, and is formed with a length L in the Y-direction, a width D in the X-direction, and a height H in the Z-direction. Each of the upper face 10a and the bottom face 10b of the electric cell 10 has the length L in the Y-direction and the width D in the X-direction. The first lateral faces 10c have the length L in the Y-direction and the height H in the Z-direction. The second lateral faces 10d have the width D in the X-direction and the height H in the Z-direction.

Figure 5:
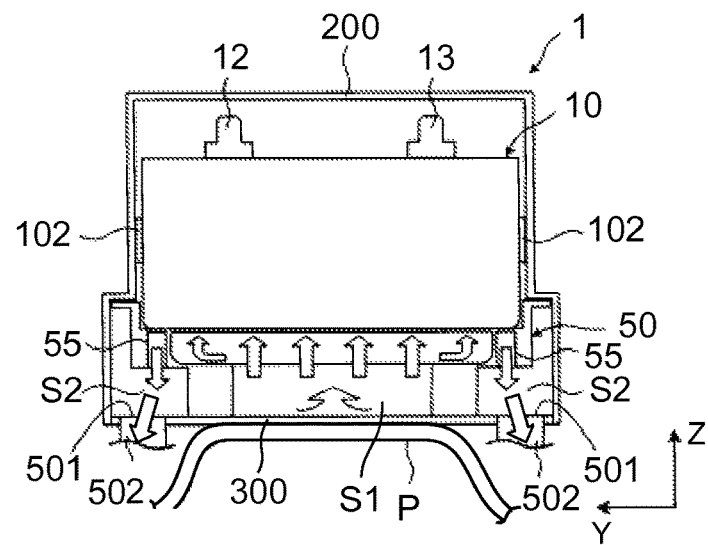
FIG. 5 is a schematic cross-sectional view of the battery pack in the first embodiment of the invention.

FIG. 5 is a schematic cross-sectional view of the battery pack 1 of the present embodiment of the invention. The guide member 50 is arranged between a bottom face (lower face) side of the assembled battery 100 and the lower case 300. The bottom face of the assembled battery 100 is arranged on the lower case 300 via the guide members 50. The upper face of the assembled battery 100 is covered with the upper case 200.

As shown in FIG. 5, the guide member 50 of the present embodiment of the invention is a guide portion that supplies the air flowing in the X-direction from a direction substantially perpendicular to the bottom face 10b of each case body 11a of the electric cell 10, and is a guide member that guides the air that has exchanged heat with the bottom face 10b of the electric cell 10, to the outside of the bottom face 10b of the electric cell 10. Then, the guide member 50 forms both the intake path S1 through which the air for temperature regulation that is supplied from the blower 400 flows, and the exhaust paths S2 through which the air that has exchanged heat with each electric cell 10 flows, on the bottom face side of the assembled battery 100.

Besides, in the present embodiment of the invention, exhaust ports 501 can be formed through, for example, the lower case 300 in a manner corresponding to the exhaust paths S2 formed by the guide member 50, respectively. Exhaust ducts 502 can be connected to the exhaust ports 501 respectively. At this moment, the exhaust ports 501 can be provided individually in the vicinity of end portions of the lower case 300 in the X-direction respectively, or as continuous exhaust ports, in accordance with the guide member 50 corresponding to the length of the assembled battery 100 in the X-direction respectively (see FIG. 2). Besides, the exhaust ports 501 can also be provided through the upper case 200 in a manner corresponding to the exhaust paths S2 formed on the end portion sides of the guide member 50 in the Y-direction respectively. Besides, the exhaust ports 501 can also be provided at the end portions of the exhaust paths S2 in the X-direction respectively, and the air discharged from the guide member 50 can also be caused to flow in the X-direction to be discharged from the end portions in the X-direction.

Next, the temperature regulation structure of the electric cell 10 (the assembled battery 100) of the present embodiment of the invention will be described in detail with reference to FIGS. 6 to 10. In the following, an aspect of cooling the electric cell 10 by bringing cooling air into contact therewith will be described as an example.

The temperature regulation structure according to the present embodiment of the invention is a temperature regulation structure for cooling the electric cell 10 by bringing air into contact only with the bottom face 10b of the electric cell 10, unlike a conventional temperature regulation structure for cooling the electric cell 10 by bringing air into contact with the lateral faces 10c thereof. That is, with the temperature regulation structure according to the present embodiment of the invention, the temperature of the assembled battery 100 is regulated by guiding the air supplied from the blower 400 to the bottom faces 10b of the plurality of the electric cells 10 constituting the bottom face of the assembled battery 100 respectively and flowing through the intake path S1 in parallel streams, and allowing the air coming into contact with the bottom faces 10b of the electric cells 10 to exchange heat.

For example, the electric cells 100 and spacers can be alternately arranged in a laminated manner in the assembled battery 10, and a space for cooling the lateral faces 10c between the electric cells 100 that are perpendicular to the direction of lamination can be formed. However, a space for causing air to flow between the electric cells 100 that are adjacent to each other in the direction of lamination needs to be formed, and the spacers need to be arranged. This constitutes a factor leading to the enlargement of the assembled battery 10.

Besides, the same holds true in view of the single electric cell 10 as well. A space for causing air for temperature regulation to flow along the lateral faces 10c of the electric cell 10 needs to be formed. Therefore, this constitutes a factor leading to an increase in the size of the battery pack. Besides, there are also cases where the lateral faces 10c of the electric cell 10 cannot be provided with a space through which air for temperature regulation flows, in the assembled battery 100 and the electric cell 10.

In this case, the temperature of the electric cell 10 needs to be regulated by bringing air into contact with faces other than the lateral faces 10c of the electric cell 10. However, as described previously, in the case where the electric cell 10 is cooled by bringing air into contact with the lid 11b above the electric cell 10, the lid 11b is configured separately from the case body 11a with which the power generation element 20 is in contact, so thermal resistance is enhanced, the efficiency of heat transfer to the lid 11b is reduced, and the cooling efficiency is low.

In contrast, the lateral faces 10d and the bottom face 10b of the case body 11a with which the power generation element 20 is in contact have lower thermal resistance than the lid 11b as shown in FIG. 4. Therefore, the temperature of the electric cell 10 can be regulated by bringing air into contact with the bottom face 10b or the lateral faces 10d of the electric cell 10 in the Y-direction. However, the lateral faces 10d may have lower heat transfer efficiency than the bottom face 10b.

As in the present embodiment of the invention, the electric cell 10 is formed to be long in the Y-direction, so the height of the assembled battery 100 (the electric cell 10) in the Z-direction can be held low. In this case, as is the case with an example of FIG. 4, the height H of the electric cell 10 in the Z-direction is shorter than the length L of the electric cell 10 in the Y-direction. Therefore, the distance from the center of the power generation element 20 (the center of the case body 11a) to the lateral faces 10d is longer than the distance from the center of the power generation element 20 (the center of the case body 11a) to the bottom face 10b, and heat is not efficiently transferred to the lateral faces 10d. In other words, the distance from the center of the power generation element 20 (the center of the case body 11a) to the bottom face 10b is short, so the heat generated by the power generation element 20 is more efficiently transferred to the bottom face 10b than to the lateral faces 10d.

Therefore, the electric cell 10 can be efficiently cooled by bringing air into contact with the bottom face 10b of the electric cell 10. However, there is a problem in that good cooling efficiency cannot be obtained when air is caused to flow parallel to the bottom face 10b of the electric cell 10.

For example, in the case where the assembled battery 100 is cooled by causing air to flow uniformly in the direction of arrangement of the electric cells 10, the cooling efficiency decreases downstream in the direction in which air flows. This is because a temperature boundary layer increases (in thickness) downstream and the efficiency of cooling the assembled battery 100 decreases when air is caused to flow uniformly in the direction of arrangement and brought into contact with the surface of the assembled battery 100 to cool the surface. Therefore, when the air that has exchanged heat with the electric cell 10 located upstream immediately exchanges heat with the electric cell 10 located downstream, there is an influence of a rise in the temperature of upstream air between the electric cells 10, so each of the electric cells 10 (the assembled battery 100) cannot be efficiently cooled.

Besides, the same holds true for the single electric cell 10 as well. The temperature of the air flowing parallel to the bottom face 10b falls as the distance from the bottom face 10b increases. That is, although heat is exchanged with the air flowing through the surface of the bottom face 10b, the air flowing away from the bottom face 10b cannot directly exchange heat with the bottom face 10b and hence is influenced by the temperature boundary layer. As a result, this air cannot efficiently cool the electric cell 10.

In contrast, with the temperature regulation structure according to the present embodiment of the invention, while air is supplied from the direction (the Z-direction) substantially perpendicular to the bottom faces 10b of the respective electric cells 10 constituting the assembled battery 10, the air flowing through the intake path S1 is brought into contact with the respective electric cells 100 in parallel streams independently of one another.

Figure 6:
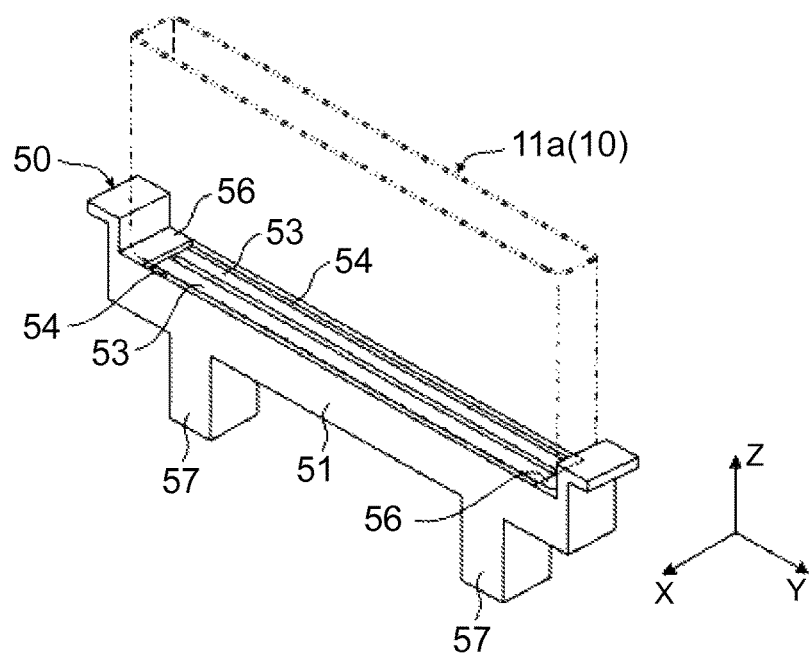
FIG. 6 is an outside perspective view showing an example of a guide member in the first embodiment of the invention.

FIG. 6 is a view showing an example of the guide member 50 of the present embodiment of the invention. The guide member 50 of the present embodiment of the invention is provided for each of the electric cells 100 constituting the assembled battery 100. Incidentally, in an example of FIG. 1 or the like, the plurality of the guide members 50 that are provided for the single electric cells 100 respectively are integrally configured. In other words, the plurality of the guide members 50 can also be provided in the direction of lamination in a manner corresponding to the plurality of the electric cells 100 constituting the assembled battery 10, or the plurality of the guide members 50 that are provided in the direction of lamination can also be configured integrally.

The guide member 50 has substantially the same width D as the bottom face 10b of the electric cell 10, and is formed to be long in a manner corresponding to the length L of the electric cell 10 (the bottom face 10b) in the Y-direction. The guide member 50 has a guide portion body 51 that is provided on the bottom face 10b side of the electric cell 10, and a pair of leg portions 57 that are arranged between the guide portion body 51 and the lower case 300.

The leg portions 57 extend from the guide portion body 51 toward the lower case 300, and have end portions that are in contact with the upper face of the lower case 300. The leg portions 57 can be provided integrally with or separately from the guide portion body 51. The leg portions 57 form a space through which air flows, between the lower case 300 and the guide portion body 51. The pair of the leg portions 57 are arranged apart from each other in the Y-direction by a predetermined distance. The space between the pair of the leg portions 57 serves as the intake path S1 for air for temperature regulation that moves in the X-direction of the electric cell 10 (the assembled battery 100). Besides, regions that are located outside in the Y-direction and that are formed by the leg portions 57 and the upper case 200 serve as the exhaust paths S2 respectively.

Figure 7:
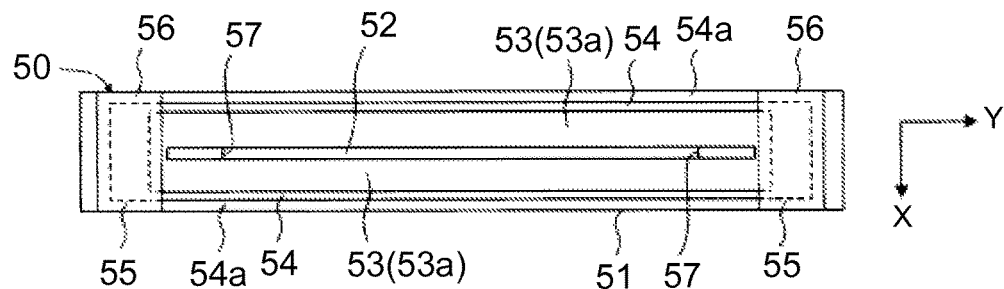
FIG. 7 is a top view of the guide member in the first embodiment of the invention.
Figure 8:
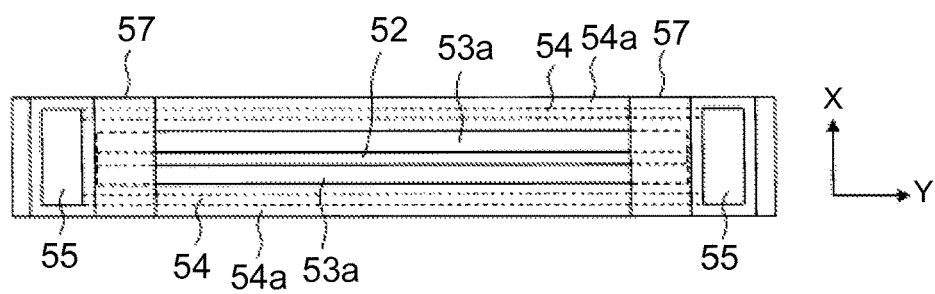
FIG. 8 is a bottom view of the guide member in the first embodiment of the invention.
Figure 9:
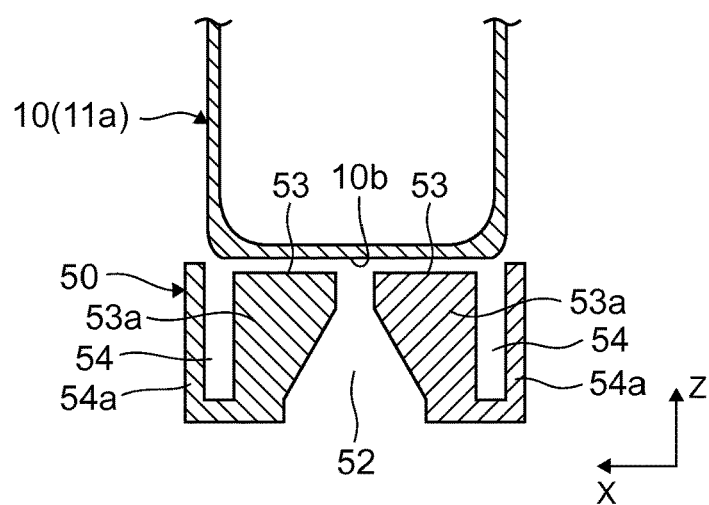
FIG. 9 is a cross-sectional view of the guide member in the first embodiment of the invention.

FIG. 7 is a top view of the guide member 50. FIG. 8 is a bottom view of the guide member 50. FIG. 9 is a cross-sectional view of the guide member 50.

The guide portion body 51 has a supply passage 52 that supplies air to the bottom face 10b of each of the electric cells 10 constituting the assembled battery 100, guide faces 53 that guide the air supplied from the supply passage 52 to the outside of the electric cell 10 along the bottom face 10b in the X-direction, exhaust passages 54 for the air that has exchanged heat with the bottom face 10b, exhaust portions 55 that are communicated with the exhaust passages 54 respectively, and installation faces 56 with which at least part of the bottom face 10b of the electric cell 10 is in contact.

As shown in FIG. 7, the installation faces 56 are regions that are provided on the upper face of the guide portion body 51 and with which the end portions of the bottom face 10b of the electric cell 10 in the Y-direction are partially in contact respectively. The installation faces 56 are provided at the end portions of the upper face of the guide portion body 51 in the Y-direction respectively, at positions corresponding to the end portions of the bottom face 10b of the electric cell 10 respectively.

The supply passage 52 is a passage for guiding the air flowing through the intake path S1 that is formed by the pair of the leg portions 57, to the bottom face 10b. The supply passage 52 can be formed by a pair of wall portions 53a that are spaced apart from each other, and is a passage that is inserted through the guide portion body 51 from the intake path S1 toward the bottom face 10b of the electric cell 10 in the Z-direction. The supply passage 52 extends in the Y-direction, and has substantially the same length as the bottom face 10b of the electric cell 10.

Each of the guide faces 53 is a face that is opposed to the bottom face 10b of the electric cell 10, and is an upper face of a corresponding one of the wall portions 53a that is located below the bottom face 10b of the electric cell 10 in the Z-direction. The guide faces 53 are provided in the X-direction respectively across the supply passage 52 extending in the Y-direction. As shown in FIG. 9, the supply passage 52 is provided in the vicinity of the center of the bottom face 10b in the X-direction. The air guided to the bottom face 10b from the supply passage 52 extending in the Y-direction is guided to both sides of the bottom face 10b in the X-direction by the guide faces 53.

Figure 10:
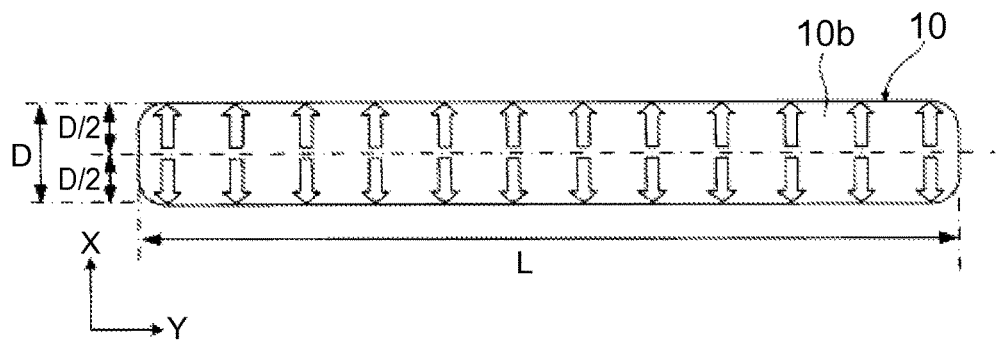
FIG. 10 is a view showing an example of the flow of the air coming into contact with a bottom face of the electric cell in the first embodiment of the invention.

The guide faces 53 have substantially the same length as the supply passage 52 extending in the Y-direction, and have a width corresponding to the width D of the bottom face 10b of the electric cell 10 in the X-direction. FIG. 10 is a view showing an example of the flow of the air coming into contact with the bottom face 10b of the electric cell 10. In the present embodiment of the invention, the electric cell 10 is cooled by causing the air guided from the supply passage 52 to flow along the width direction that is shorter than the bottom face 10b, which is long in the Y-direction.

That is, the air having a width of the length L is supplied to the bottom face 10b of the electric cell 10 from the supply passage 52, and flows in the width direction of the bottom face 10b. Therefore, a uniform stream of the air having the length L flows in the X-direction along the bottom face 10b, and comes into contact with the bottom face 10b, so the cooling efficiency is higher than in the case where air is caused to flow in the length direction of the bottom face 10b in the Y-direction.

More specifically, a uniform stream of the air having the length L is at the same temperature in the Y-direction. The cooling length of flowing air is short, namely, is equal to the width D (D/2 in the case where the supply passage 52 is provided in the vicinity of the center of the bottom face 10b in the X-direction). Therefore, heat exchange can be efficiently carried out in the Y-direction.

Each of the exhaust passages 54 is a passage for discharging the air for heat exchange, and is formed by a corresponding one of the wall portions 53a and a wall portion 54a, which are spaced apart from each other. Each of the exhaust passages 54 is provided in a manner partitioned from the supply passage 52 by a corresponding one of the wall portions 53a, at a position adjacent to the supply passage 52 in the X-direction. Each of the exhaust passages 54 of the present embodiment of the invention is connected to the supply passage 52 via a corresponding one of the guide faces 53. The two exhaust passages 54 are arranged on both sides in the X-direction respectively.

Each of the guide faces 53 of the present embodiment of the invention guides the air that has flowed into the bottom face 10b of the electric cell 10 from the supply passage 52 to exchange heat with the bottom face 10b, toward the exhaust passage 54 adjacent to the supply passage 52 in the X-direction, along the bottom face 10b. At this time, the supply passage 52 is partitioned from the exhaust passages 54 by the wall portions 53a respectively. The lower sides of the exhaust passages 54 in the Z-direction are closed up by the wall portions 54a respectively, and are partitioned from the intake path S1.

Each of the exhaust passages 54 communicates with a corresponding one of the exhaust portions 55 at an end portion in the Y-direction. Each of the exhaust portions 55 is an opening portion that is arranged outside a corresponding one of the leg portions 57 in the Y-direction and that opens toward the lower face of the guide portion body 51. The exhaust passages 54 are connected to the right and left exhaust portions 55 at the end portions in the Y-direction respectively. The air that has flowed through the exhaust passages 54 is guided to the exhaust portions 55 respectively. The exhaust ports 55 communicate with the exhaust paths S2 that are formed outside the leg portions 57 in the Y-direction, respectively. The air discharged from the exhaust portions 55 is discharged to the outside of the battery pack 1 via the exhaust paths S2 respectively.

A positional relationship between the guide faces 53 and the installation faces 56 of the guide portion body 51 will now be described. As shown in FIGS. 6 and 9, the guide faces 53 are located below the installation faces 56, with which the bottom face 10b of the electric cell 10 is in contact, in the Z-direction. A space in which air flows in the X-direction is formed between the bottom face 10b and the guide faces 53. Therefore, a difference in level is formed between the installation faces 56 and the guide faces 53 in the Z-direction. The installation faces 56 are provided in regions of the end portions of the guide faces 53 in the Y-direction respectively.

Besides, the upper faces of the wall portions 54a are located above the guide faces 53 in the Z-direction, and are located on the same X-Y plane as the installation faces 56 in the Z-direction. The guide faces 53 are sandwiched by the wall portions 54a in the X-direction, and are partitioned from the guide member 50 for adjacent ones of the electric cells 10. Incidentally, the upper faces of the wall portions 54a can be configured to be located above the installation faces 56 in the Z-direction respectively. For example, the upper portions of the wall portions 54a can be configured to be adjacent to or in contact with the lateral faces 10c of the electric cell 10 on the lower end side in the Z-direction respectively.

Besides, as shown in FIG. 9, the supply passage 52 of the present embodiment of the invention can be configured in the shape of a nozzle. That is, the supply passage 52 can be formed such that the width of the passage extending toward the bottom face 10b in the Z-direction (the width in the X-direction) narrows as the distance to the bottom face 10b decreases. The supply passage 52 is formed in the shape of a nozzle from the intake path S1 toward the bottom face 10b of the electric cell 10, so the flow velocity of the air supplied to the bottom face 10b can be enhanced, and air can be supplied to the bottom face 10b in a colliding manner. Owing to this configuration, heat exchange of the air coming into contact with the bottom face 10b is promoted, and the cooling efficiency is enhanced. Incidentally, the width of a tip of the nozzle (an opening width of the supply passage 52 facing the bottom face 10b in the X-direction) can be set to any value.

Figure 11:
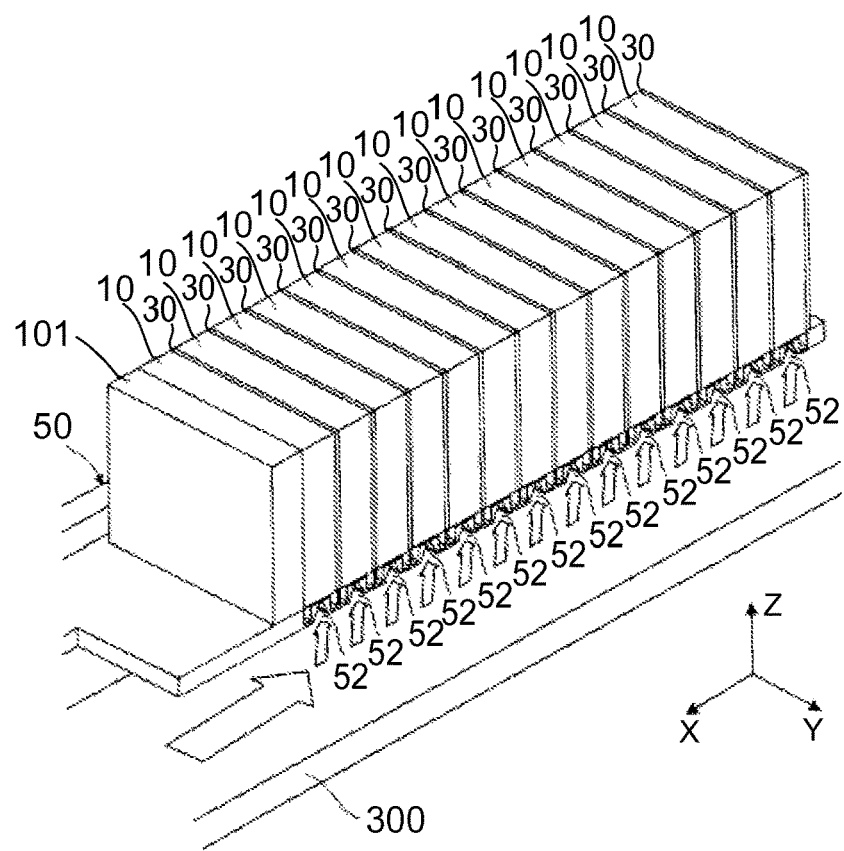
FIG. 11 is a view for illustrating an aspect in which the air flowing through an intake path is guided to each of electric cells constituting an assembled battery by the guide member in the first embodiment of the invention.
Figure 12:
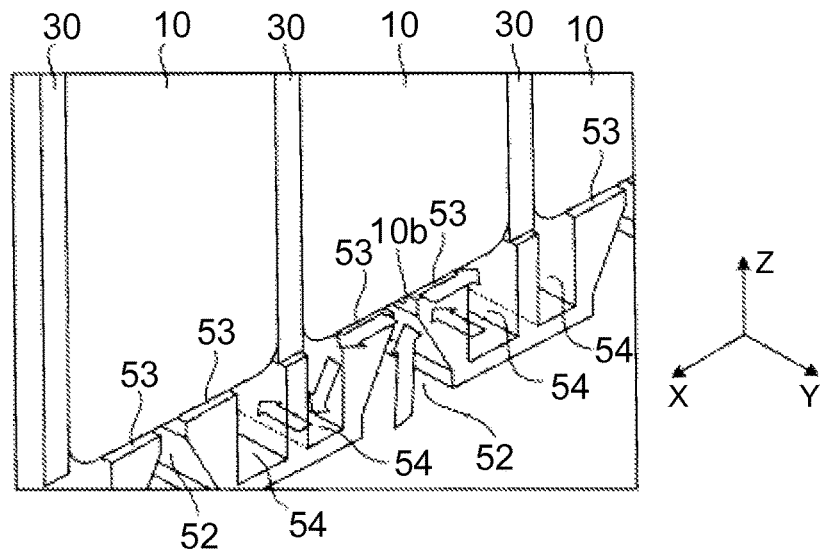
FIG. 12 is a view for illustrating the suction and discharge of air for temperature regulation against the bottom faces of the electric cells in the first embodiment of the invention, and is a partially enlarged view of FIG. 11.

Next, the flow of air in the temperature regulation structure according to the present embodiment of the invention will be described with reference to FIGS. 11 to 14. FIG. 11 shows an aspect in which the air flowing through the intake path S1 is guided to the respective electric cells 10 constituting the assembled battery 100 by the guide member 50, and represents part of the cross-section of FIG. 1 in the X-direction. FIG. 12 is a partially enlarged view of FIG. 11.

As shown in FIG. 11, the air supplied from the blower 400 flows through the intake path S1, which is formed by the pair of the leg portions 57 and the lower case 300, in the X-direction. Each of the electric cells 10 of the assembled battery 100, which are arranged side by side in the X-direction, is provided with the guide member 50. Therefore, the air flowing in the X-direction flows in parallel streams into the respective supply passages 52 located above the intake path S1 in the Z-direction.

Therefore, the temperature of the air upstream of the intake path S1 and the temperature of the air downstream of the intake path S1 are equal to each other. The air flowing into the supply passage 52 downstream of the intake path S1 is not influenced by the air that has been warmed through the exchange of heat with the upstream electric cell 10.

Figure 13:
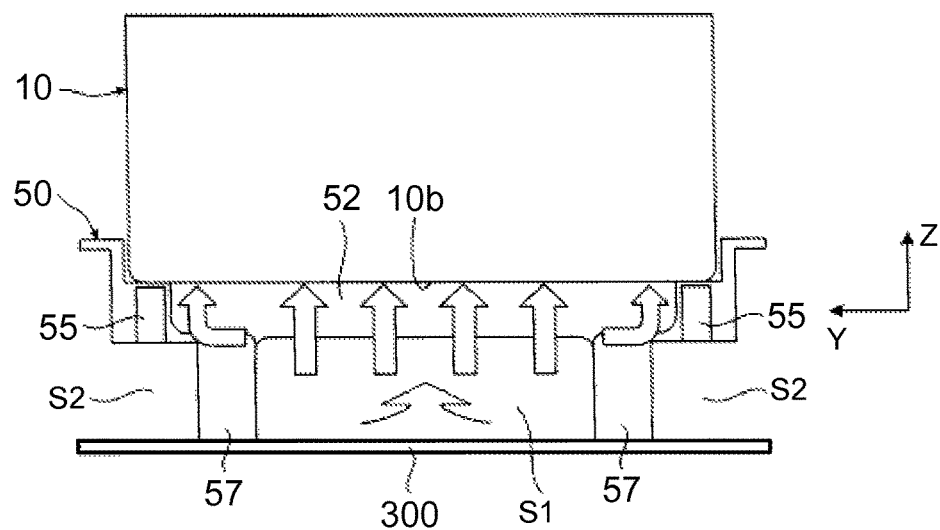
FIG. 13 is an example showing an aspect in which air is sucked to the bottom face of the electric cell by the guide members in the first embodiment of the invention.

The supply passage 52 opens to the bottom face 10b of the electric cell 10, and guides air in the direction substantially perpendicular to the bottom face 10b. FIG. 13 is an example showing an aspect in which air is sucked to the bottom face 10b of the electric cell 10 by the guide member 50. Air flows upward in the Z-direction from the intake path S1, and comes into contact with the bottom face 10b, which assumes a planar shape in the X-direction, substantially perpendicularly thereto from the Z-direction.

The air that has come into contact with the bottom face 10b substantially perpendicularly thereto turns by approximately 90°, and flows through the space between the guide faces 53 on both the sides of the supply passage 52 in the X-direction and the bottom face 10b, in the width direction of the bottom face 10b. The air having the length L in the Y-direction, which has been caused to flow in the width direction of the bottom face 10b by the guide faces 53, is guided toward the exhaust passages 54, which are provided on both the sides of the supply passage 52 in the X-direction respectively, via the guide faces 53 respectively.

Figure 14:
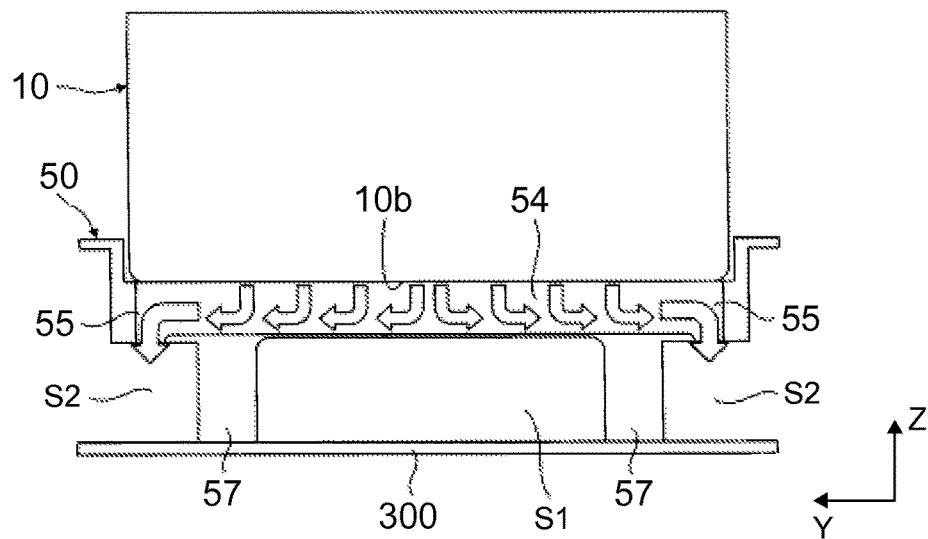
FIG. 14 is an example showing an aspect in which the air that has come into contact with the bottom face of the electric cell is discharged by the guide members in the first embodiment of the invention.

FIG. 14 is an example showing an aspect in which the air that has come into contact with the bottom face 10b of the electric cell 10 is discharged by the guide member 50. As shown in FIG. 14, the air flowing into the exhaust passages 54 from the guide faces 53 flows downward in the Z-direction with respect to the guide faces 53, and flows toward the end portions of the electric cell 10 in the Y-direction (outward in the Y-direction). The exhaust portions 55 are provided at the end portions of the exhaust passages 54 in the Y-direction respectively. Therefore, air flows through the exhaust passages 54 to be discharged to the exhaust paths S2 from the exhaust portions 55 respectively.

As shown in FIGS. 13 and 14, according to the present embodiment of the invention, air is sucked to the bottom face 10b of the electric cell 10 substantially perpendicularly thereto from the Z-direction. Furthermore, air is discharged downward with respect to the bottom face 10b in the Z-direction. Therefore, the guide member 50 is provided with the supply passage 52, the guide faces 53, and the exhaust passages 54 in a manner corresponding to the bottom face 10b, for the single electric cell 10. Air can be sucked and discharged against the electric cell 10 on the single bottom face 10b for the purpose of temperature regulation.

That is, in the present embodiment of the invention, air is sucked to the bottom face 10b of the electric cell 10 substantially perpendicularly thereto from the Z-direction, and air flows downward with respect to the bottom face 10b in the Z-direction (in a direction away from the lid 11b in the Z-direction) to be discharged in the Y-direction. Therefore, the suction and discharge of air is completed for the single bottom face 10b.

Besides, the intake path S1 and the exhaust paths S2 are formed below the assembled battery 100 (the electric cell 10) by the guide member 50. The intake path S1 is partitioned from the exhaust paths S2 in the Y-direction by the pair of the leg portions 57 respectively. The air guided to the bottom face 10b of the electric cell 10 from the intake path S1 for heat exchange flows to the exhaust paths S2, which are partitioned from the intake path S1.

Accordingly, the air guided to the bottom faces 10b of the electric cells 10 flows to the partitioned exhaust paths S2, which are not in contact with the air flowing through the intake path S1, thus constituting the independent suction and discharge of air for the single electric cell 10. Therefore, the air guided to the bottom face 10b of the electric cell 10 downstream of the intake path S1 is substantially at the same temperature as, for example, the air guided to the bottom face 10b of the electric cell 10 upstream. The air for temperature regulation that is supplied from the blower 400 is sucked and discharged in parallel streams (individually) against the bottom faces 10b of the respective electric cells 10 constituting the assembled battery 100.

According to the present embodiment of the invention, the air for temperature regulation that comes into contact with the electric cell 10 is supplied from the direction substantially perpendicular to the bottom face 10b of the case body 11a constituting the electric cell 10. Therefore, the temperature of the electric cell 10 can be efficiently regulated.

In particular, the air having the width L is supplied to the bottom face 10b of the electric cell 10 from the supply passage 52, and flows in the width direction of the bottom face 10b. Therefore, the length of the path along which the uniform stream of air having the length L exchanges heat is short, so the electric cell 10 can be efficiently cooled. Besides, the supply passage 52 is provided in the vicinity of the center of the bottom face 10b in the X-direction. Thus, the length of the path along which the uniform stream of air having the length L exchanges heat is further shortened (D/2), so the electric cell 10 can be more efficiently cooled.

In view of the single electric cell 10, the temperature regulation structure for bringing air into contact only with the single face (the bottom face) of the electric cell 10 can be realized, and the entire battery can be made small in size. Besides, in the assembled battery 100, the electric cells 10 can be arranged close to one another without the need to alternately arrange the electric cells 10 and the spacers in a laminated manner. As a result, the assembled battery 100 can be reduced in size.

Besides, the positive electrode terminal 12, the negative electrode terminal 13, and the valve 11c are arranged on the lid 11b. Therefore, an exhaust path (an exhaust duct) or the like for gas needs to be installed for the valve 11c (the exhaust portion) or the bus bar that electrically connects the plurality of the electric cells 10 to one another. However, the temperature regulation structure is designed only for the single face (the bottom face) of the electric cell 10. Therefore, there is no need to provide a space or passage through which air for temperature regulation flows, on the upper face 10a side of the electric cell 10.

For example, when air is caused to flow to the upper face side of the electric cell 10 in the case where the positive electrode terminal 12, the negative electrode terminal 13, and the valve 11c are arranged on the upper face of the electric cell 10, a cooling path for the air moving toward the upper face of the electric cell 10 that is in contact with the lateral face 10c or the air flowing along the upper face of the electric cell 10 must be provided in addition to the bus bar and the exhaust path for discharged gas, on the upper face side of the electric cell 10. Therefore, the cooling path, the bus bar, and the exhaust path for discharged gas interfere with one another on the upper face of the electric cell 10, thus constituting a factor leading to structural complication and a deterioration in the assemblability of the battery (e.g., the efficiency of assembling operation).

However, the temperature regulation structure according to the present embodiment of the invention is a temperature regulation structure designed only for the bottom face 10b of the electric cell 10, so the operation of assembling the assembled battery 100 is facilitated. Besides, air for temperature regulation is restrained from interfering with the gas or the like discharged from the positive electrode terminal 12, the negative electrode terminal 13, and the valve 11c. As a result, structural complication of the assembled battery 100 and the battery pack 1 can be suppressed.

Furthermore, the air for temperature regulation that is supplied from the blower 400 is sucked and discharged in parallel streams (individually) against the bottom faces 10b of the respective electric cells 10 constituting the assembled battery 100 by the guide member 50. Therefore, the cooling efficiencies of the respective electric cells 10 can be homogenized, and the temperature can be restrained from dispersing among the electric cells 10. Besides, the electric cells 10 are arranged close to one another via the insulating members 30 respectively, so the temperature is also restrained from dispersing among the electric cells 10.

Besides, the guide member 50 sucks the air moving substantially perpendicularly to the Z-direction to the bottom face 10b of the electric cell 10, and discharges the air flowing downward in the Z-direction (in the direction away from the lid 11b in the Z-direction) and moving toward the Y-direction from the bottom face 10b, independently for the bottom face 10b of each of the electric cells 10. Also, the intake path S1 and the exhaust paths S2, which are partitioned from each other in the battery pack 1, are formed to be aligned in the Y-direction. Therefore, the components are concentrated below the assembled battery 100, and the temperature regulation structure for the electric cells 10 can be simplified and reduced in size.

Incidentally, in the foregoing description, the upper case 200 covering the upper face of the assembled battery 100 (the electric cells 10) may not be provided. For example, there may be adopted a configuration in which part of the lower case 300 is extended to assume such a shape as to cover the lateral faces of the guide member 50 in the Y-direction, and the guide member 50 and the lower case 300 partition the intake path S1 and the exhaust path S2 from each other below the assembled battery 100. In this case, the upper case 200 as the temperature regulation structure can be omitted, and a cover that simply covers a space above the assembled battery 100 can be provided.

Besides, the guide member 50 can also be configured integrally with the lower case 300. For example, the guide member 50 can be arranged below the assembled battery 100 as the lower case 300, or the lower case 300 can be formed in the shape of the guide member 50.

Next, modification examples of the guide member 50 of the present embodiment of the invention will be described with reference to FIGS. 15 to 19. In each of the modification examples, the supply passage 52, the guide faces 53, and the exhaust passages 54 are similar in configuration and function to those of the aforementioned guide member 50. The following description will focus on the differences.

Figure 15:
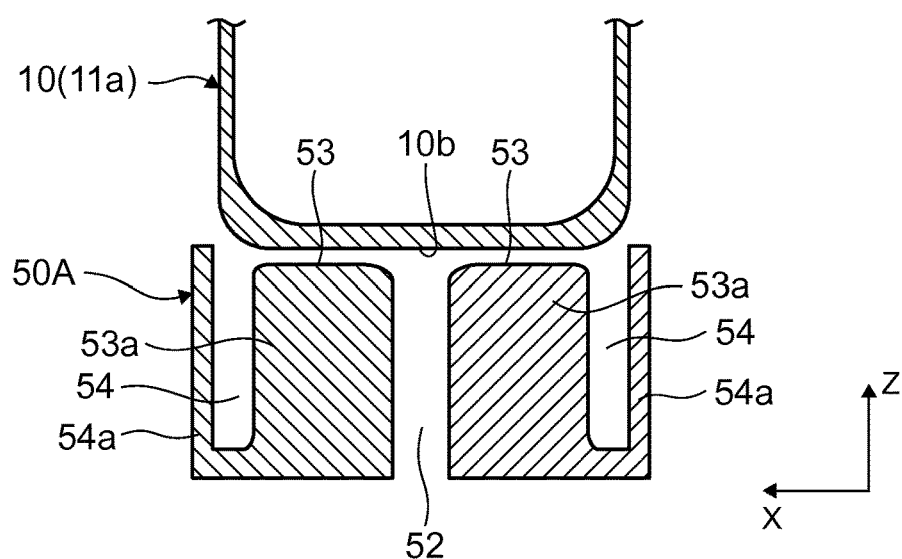
FIG. 15 is a cross-sectional view showing a first modification example of the guide member in the first embodiment of the invention.

FIG. 15 is a cross-sectional view showing the first modification example of the guide member of the present embodiment of the invention. A guide member 50A shown in FIG. 15 represents an example in which the supply passage 52 is configured to extend linearly in the Z-direction instead of assuming the shape of a nozzle. In this case as well, air can be guided from the intake path S1 to the bottom face 10b from the direction substantially perpendicular to the bottom face 10b of the electric cell 10 (the Z-direction).

Figure 16:
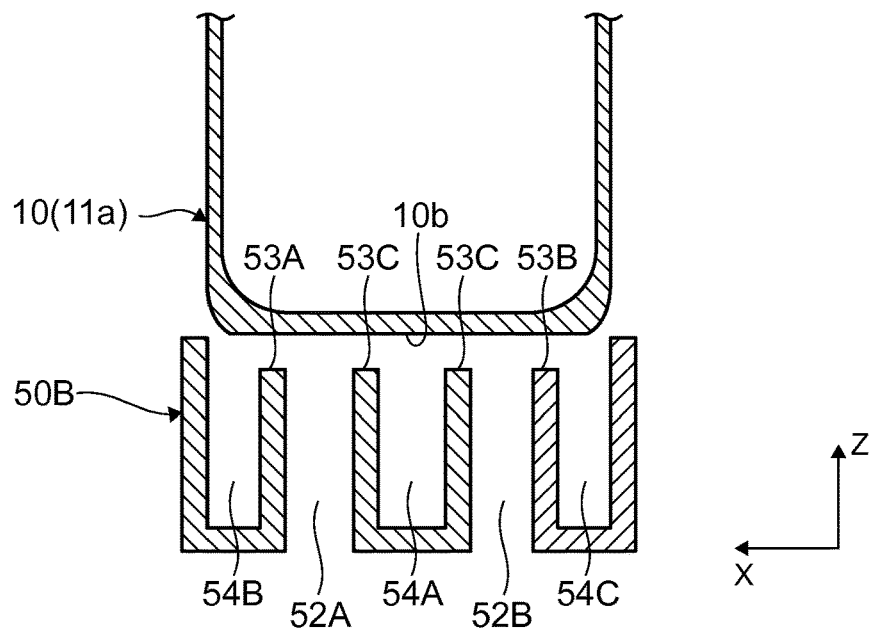
FIG. 16 is a cross-sectional view showing a second modification example of the guide member in the first embodiment of the invention.

FIG. 16 is a cross-sectional view showing the second modification example of the guide member according to the present embodiment of the invention. In a guide member 50B shown in FIG. 16, the bottom face 10b of the electric cell 10 is provided with a plurality of supply passages 52 that extend linearly in the Z-direction of the guide member 50A shown in FIG. 15. As shown in FIG. 16, supply passages 52A and 52B are arranged apart from each other in the X-direction, for the bottom face 10b. An exhaust passage 54A is provided between the supply passage 52A and the supply passage 52B. The supply passages 52A and 52B communicate with exhaust passages 54A via guide faces 53C respectively.

The supply passage 52A communicates with an exhaust passage 54B that is provided on one end portion side in the X-direction, via a guide face 53A. The supply passage 52A is sandwiched by the exhaust passage 54A and the exhaust passage 54B in the X-direction. By the same token, the supply passage 52B communicates with an exhaust passage 54C that is provided on the other end portion side in the X-direction, via a guide face 53B. The supply passage 52B is sandwiched by the exhaust passage 54A and the exhaust passage 54C in the X-direction.

The guide member 50B shown in FIG. 16 can supply a large amount of air to the bottom face 10b from the plurality of the supply passages 52A and 52B in the case where the bottom face 10b of the electric cell 10 has a large width in the X-direction. Therefore, good cooling efficiency can be obtained.

Figure 17:
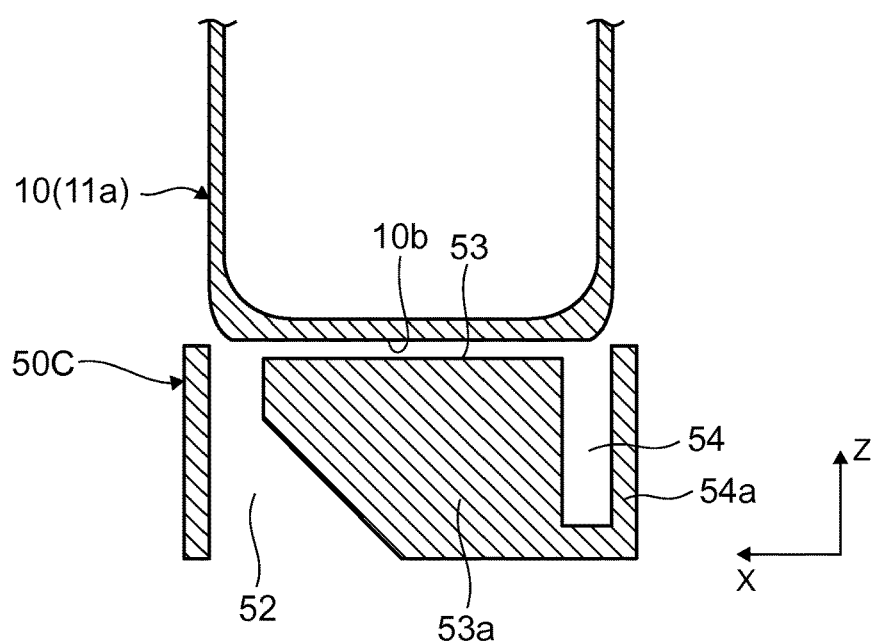
FIG. 17 is a cross-sectional view showing a third modification example of the guide member in the first embodiment of the invention.

FIG. 17 is a cross-sectional view showing the third modification example of the guide member 50. In a guide member 50C shown in FIG. 17, the arrangement of the supply passage 52 in the X-direction is changed. The supply path 52 is arranged on the end portion side of the bottom face 10b of the electric cell 10 in the X-direction instead of being arranged in the vicinity of the center of the bottom face 10b in the X-direction. The supply passage 52 is provided on one end side of the bottom face 10b of the electric cell 10 in the X-direction, and the exhaust passage 54 is provided on the other end side via the guide face 53. The air guided to the bottom face 10b from the supply passage 52 flows from one end side toward the other end side in the X-direction. In this case as well, the length of the path along which a uniform stream of air having the length L flows in the X-direction for heat exchange is short, so the electric cell 10 can be efficiently cooled.

Figure 18:
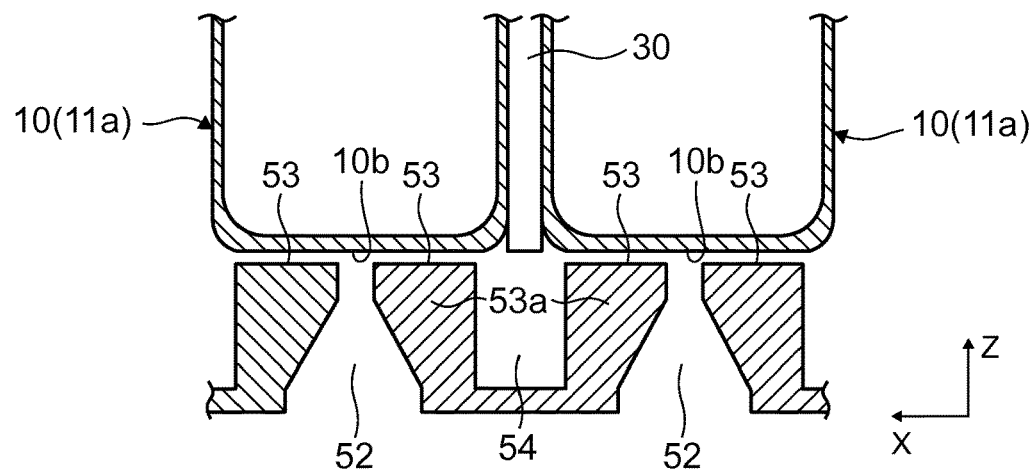
FIG. 18 is a cross-sectional view showing a fourth modification example of the guide members in the first embodiment of the invention.

FIG. 18 is a cross-sectional view showing the fourth modification example of the guide members 50. The modification example of FIG. 18 represents an exemplary case where the guide members 50 provided for the respective electric cells 10 constituting the assembled battery 100 are integrally configured in the X-direction of the assembled battery 100.

As for the guide members 50 shown in FIG. 9, the exhaust passages 54 are partitioned by the wall portions 54a respectively between the guide members 50 that are adjacent to each other in the X-direction. In the modification example of FIG. 18, however, the wall portions 54a are dispensed with, and each of the exhaust passages 54 is shared between the guide members 50 that are adjacent to each other in the X-direction. Owing to this configuration, the guide members 50 are simplified in configuration, and the flow passage area of the exhaust passages 54 increases. Therefore, the pressure loss in sucking and discharging air against the guide members 50 can be reduced.

Figure 19:
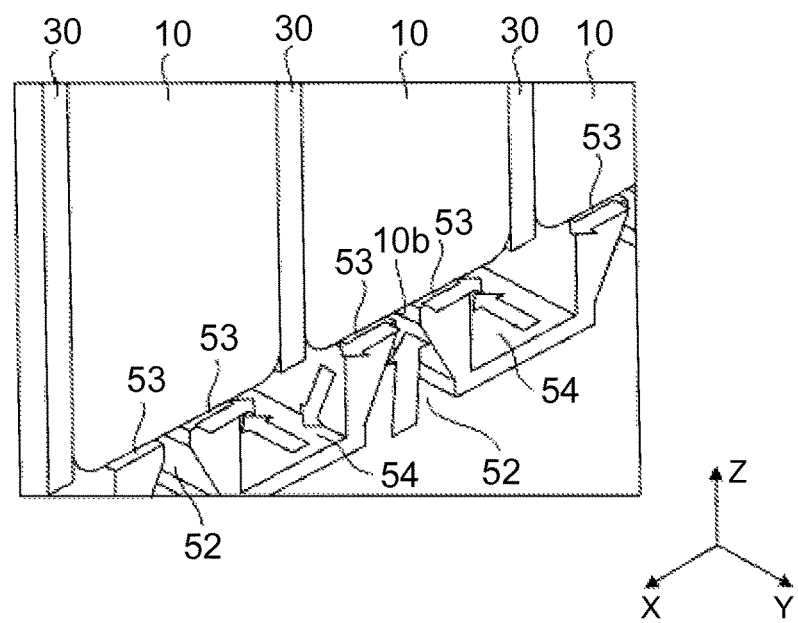
FIG. 19 is a view for illustrating the suction and discharge of air for temperature regulation against bottom faces of electric cells of the fourth modification example in the first embodiment of the invention.

FIG. 19 is a view for illustrating the flow of the air sucked and discharged against the bottom faces 10b of the electric cells 10 by guide members 50D in which the exhaust passages 54 are shared between the guide members 50 of the modification example of FIG. 18 respectively. As is the case with the example shown in FIG. 12, the supply passages 52 are open to the bottom faces 10b of the electric cells 10 respectively, and guide air substantially perpendicularly to the bottom faces 10b. The air flows upward in the Z-direction from the intake path S1, and comes into contact with the bottom faces 10b, which assume a planar shape in the X-direction, from the Z-direction.

The air that has come into contact with the bottom faces 10b substantially perpendicularly thereto turns by approximately 90°, and flows in the width direction of the bottom faces 10b through the spaces between the bottom faces 10b and the guide faces 53 located on both the sides of the supply passages 52 respectively. The air having the length L in the Y-direction, which has flowed along the bottom faces 10b in the width direction by the guide faces 53, is guided to each of the exhaust passages 54 that are provided on both the sides of the supply passages 52 in the X-direction via the guide faces 53 respectively. At this moment, each of the exhaust passages 54 is shared by adjacent ones of the guide members 50. The single exhaust passage 54 is provided between the respective supply passages 52 between adjacent ones of the electric cells 10. The shared exhaust passage 54 guides the air flowing in from the guide faces 53 on both the sides in the X-direction respectively, to the exhaust portions 55 that are provided on the end portion sides in the Y-direction respectively.

Figure 20:
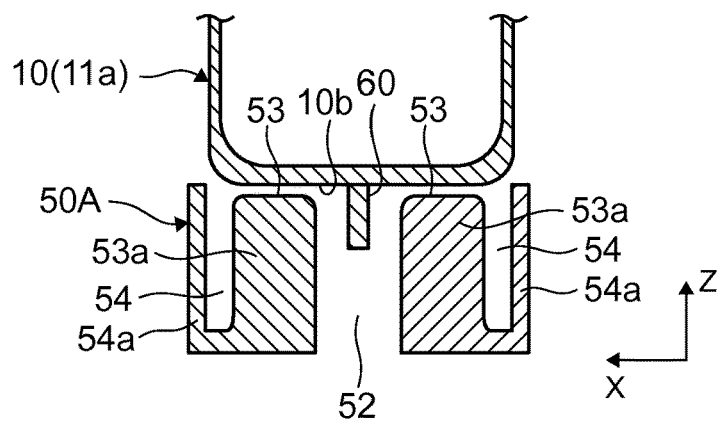
FIG. 20 is a cross-sectional view showing a fifth modification example in the first embodiment of the invention.

FIG. 20 is an example in which the guide member 50A shown in FIG. 15 is applied to the bottom face 10b of the electric cell 10 that is provided with a radiating fin 60. The radiating fin 60 can be provided so as to protrude into the supply passage 52 from the bottom face 10b, and part of the radiating fin 60 is located in the supply passage 52. Air comes into contact with the radiating fin 60 as well as the bottom face 10b, so better cooling efficiency can be obtained. Incidentally, a guide member other than the guide member 50A shown in FIG. 15 can also be applied to the bottom face 10b of the electric cell 10 that is provided with the radiating fin 60.

Second Embodiment

The second embodiment of the invention will be described using FIGS. 21 to 24. Incidentally, members identical in function to those described in the first embodiment of the invention are denoted by the same reference symbols respectively, and will not be described in detail. In the following, what is different from the first embodiment of the invention will be mainly described.

Figure 21:
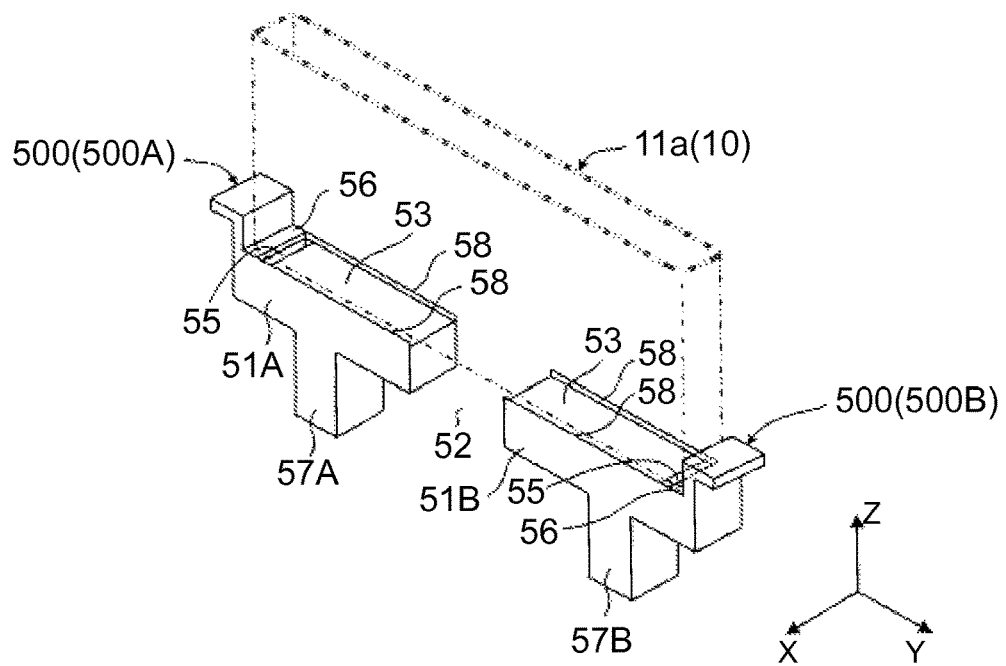
FIG. 21 is an outside perspective view showing an example of guide members in a second embodiment of the invention.
Figure 22:
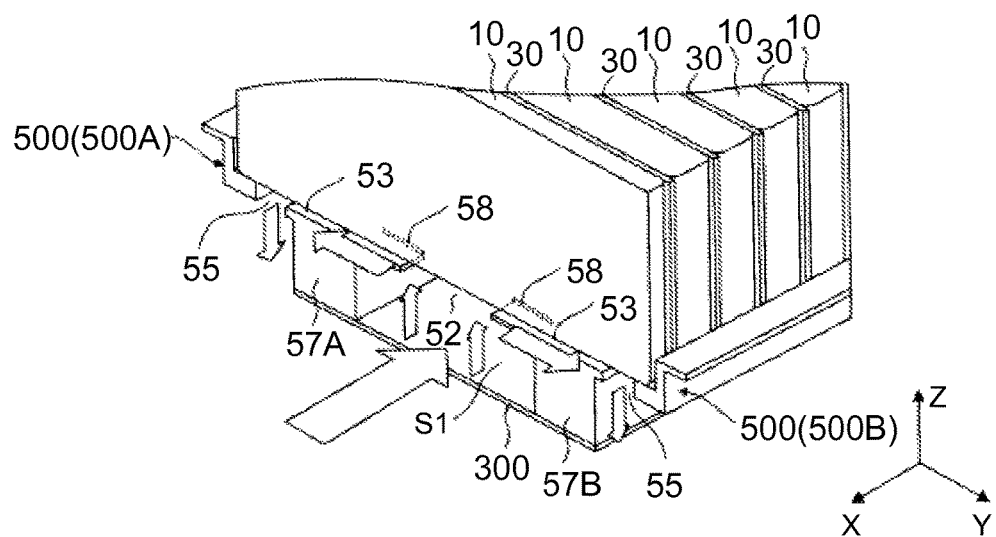
FIG. 22 is a view for illustrating an aspect in which the air flowing through an intake path is guided to each of electric cells constituting an assembled battery by the guide members and then flows along a bottom face of each of the electric cells in a length direction in the second embodiment of the invention.

In the present embodiment of the invention, the air supplied to the bottom face 10b of the electric cell 10 substantially perpendicularly thereto from the Z-direction flows in the length direction of the electric cell 10 (the Y-direction) to cool the electric cell 10. FIG. 21 is an outside perspective view showing an example of guide members 500 of the present embodiment of the invention. FIG. 22 is a view for illustrating an aspect in which the air flowing through the intake path S1 of the present embodiment of the invention is guided to the respective electric cells 10 constituting the assembled battery 100 by the guide members 500 and flows along the bottom faces 10b of the electric cells 10 in the length direction.

As shown in FIG. 21, the guide members 500 are configured as two guide members 500A and 500B that are laterally symmetrical to each other. The guide members 500 of the present embodiment of the invention are obtained by arranging the guide members 50 shown in the aforementioned first embodiment of the invention with the guide portion body 51 split in the X-direction in the region between the pair of the leg portions 57, and with respective guide portion bodies 51A and 51B spaced apart from the bottom face 10b of the electric cell 10 in the Y-direction.

As shown in FIG. 22, the guide members 500 configured as the two guide members 500A and 500B form the intake path S1 shown in the first embodiment of the invention by a space between respective leg portions 57A and 57B of the two guide members 500A and 500B that are arranged apart from each other in the Y-direction. Besides, openings for the bottom faces 10b of the electric cells 10 between the guide members 500A and 500B that are arranged apart from each other in the Y-direction form the supply passage 52.

In the guide members 500A and 500B, the guide faces 53 have substantially the same width as the bottom faces 10b of the electric cells 10 in the X-direction, and extend in the Y-direction. Each of the guide faces 53 is provided, at the end portion thereof in the Y-direction, with a corresponding one of the exhaust portions 55. The air that has flowed along the bottom faces 10b of the electric cells 10 in the Y-direction is guided to the exhaust portions 55. The exhaust portions 55 are located outside the leg portions 57A and 57B of the two guide members 500A and 500B in the Y-direction respectively, and communicate with the exhaust paths S2 partitioned from the intake path S1.

Besides, as is the case with the aforementioned first embodiment of the invention, the guide faces 53 are located below the installation faces 56 in the Z-direction. Spaces through which air flows in the Y-direction are formed between the bottom faces 10b and the guide faces 53 respectively. A difference in level is formed in the Z-direction between the installation faces 56 and the guide faces 53. The installation faces 56 are provided in the regions of the end portions of the guide faces 53 in the Y-direction respectively.

Besides, wall portions 58 are provided at both ends of the guide faces 53 in the X-direction respectively. The wall portions 58 are located above the guide faces 53 in the Z-direction respectively, and are located on the same X-Y plane as the installation faces 56 in the Z-direction respectively. The guide faces 53 are sandwiched by the wall portions 58 in the X-direction, and are partitioned from the guide members 500 for the adjacent electric cells 10. Incidentally, as is the case with the wall portions 54a of the first embodiment of the invention, the wall portions 58 can be configured to be located above the installation faces 56 in the Z-direction respectively.

Figure 23:
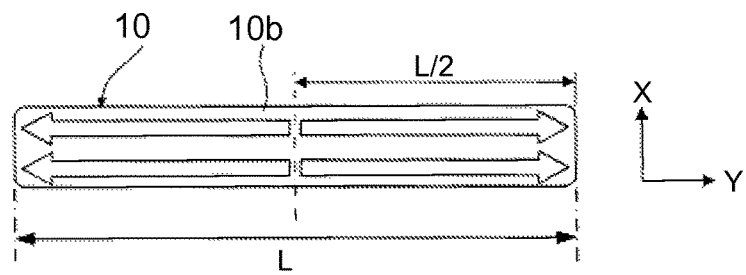
FIG. 23 is a view showing an example of the flow of the air coming into contact with the bottom face of the electric cell in the second embodiment of the invention.
Figure 24:
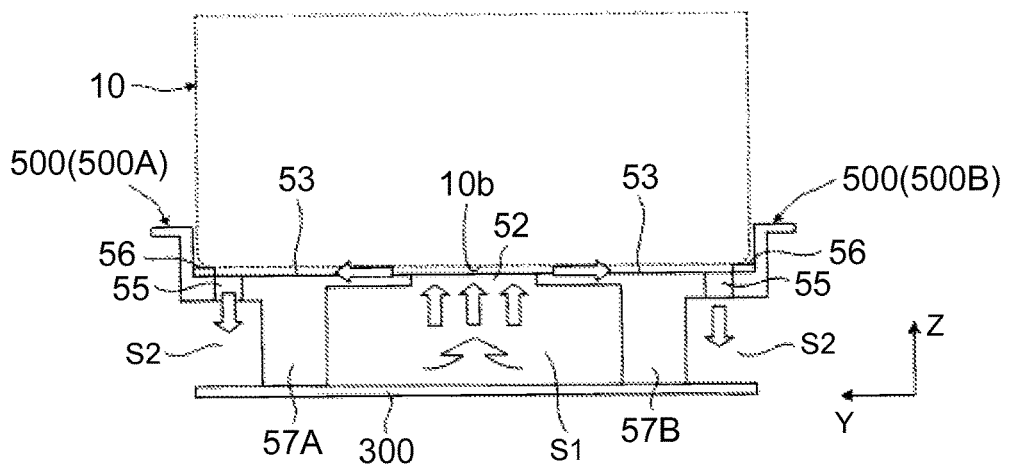
FIG. 24 is a cross-sectional view of the guide members in the second embodiment of the invention.

FIG. 23 is a view showing an example of the flow of the air coming into contact with the bottom face 10b of the electric cell 10 of the present embodiment of the invention. FIG. 24 is a cross-sectional view of the guide member of the present embodiment of the invention.

As shown in FIG. 23, in the present embodiment of the invention, the air guided from the supply passage 52 along the length direction of the bottom face 10b, which has the length L longer than the width direction, is caused to flow along the bottom face 10b, which is long in the Y-direction, thus cooling the electric cell 10. That is, the air having the same width D as the bottom face 10b of the electric cell 10 is supplied from the supply passage 52, and flows in the length direction of the bottom face 10b (the Y-direction). The cooling length of the air flowing in the Y-direction along the bottom faces 10b of the electric cells 10 in each of the guide members 500A and 500B is approximately half of the length L of the bottom faces 10b or shorter than the length L.

As shown in FIG. 24, air flows upward in the Z-direction from the intake path S1, and comes into contact with the bottom face 10b, which assumes a planar shape in the X-direction, substantially perpendicularly thereto from the Z-direction. The air that has come into contact with the bottom face 10b substantially perpendicularly thereto turns by approximately 90°, and flows in the length direction of the bottom face 10b through the spaces between the bottom face 10b and the guide faces 53 located on both the sides of the supply passage 52 respectively. The air having the width D in the X-direction, which has been caused to flow along the bottom face 10b in the length direction by the guide faces 53, flows toward the end portions of the electric cell 10 in the Y-direction. The exhaust portions 55 are provided at the end portions of the guide members 500A and 500B in the Y-direction respectively. Therefore, the air flows along the guide faces 53, and is discharged from the exhaust portions 55 to the exhaust paths S2 respectively.

In the present embodiment of the invention as well, the guide members 500 are provided with the supply passage 52, the guide faces 53, and the exhaust portions 55 in a manner corresponding to the bottom face 10b, for the single electric cell 10. Air for temperature regulation is sucked and discharged against the electric cell 10 on the single bottom face 10b. Besides, the intake path S1 and the exhaust paths S2 are formed below the assembled battery 100 (the electric cell 10) by the guide members 500. The intake path S1 is partitioned from the exhaust paths S2 by the respective leg portions 57A and 57B in the Y-direction. The air guided to the bottom face 10b of the electric cell 10 from the intake path S1 for heat exchange flows to the exhaust paths S2, which are partitioned from the intake path S1.

As described hitherto, in the present embodiment of the invention as well as the aforementioned first embodiment of the invention, the air for temperature regulation that comes into contact with the electric cell 10 is supplied from the direction substantially perpendicular to the bottom face 10b of the case body 11a constituting the electric cell 10. Therefore, the temperature of the electric cell 10 can be efficiently regulated.

Besides, although the length of the path of the air coming into contact with the bottom face 10b of the electric cell 10 is longer than in the aforementioned first embodiment of the invention, the electric cell 10 can be efficiently cooled. In particular, the temperature regulation structure according to the present embodiment of the invention makes it possible to obtain a more advantageous effect than in the first embodiment of the invention, for the electric cell 10 in which the width of the bottom face 10b of the electric cell 10 in the X-direction is long and the length of the bottom face 10b of the electric cell 10 in the Y-direction is relatively short with respect to the intake path S1 extending in the X-direction.

Furthermore, in comparison with the first embodiment of the invention, the guide members 500 do not have the exhaust passages 54 respectively. Therefore, there is no need to provide the wall portions (the ribs) 53a and 54a forming the exhaust passages 54, and the like, and the simplification of configuration is achieved. Therefore, the cost of the guide members 500 can be reduced.

Incidentally, in each of the aforementioned first embodiment of the invention and the aforementioned second embodiment of the invention, the aspect in which the positive electrode terminal 12 and the negative electrode terminal 13 are provided on the face of the electric cell 10 that sandwiches the power generation element 20 between itself and the bottom face 10b of the electric cell 10 has been described as an example, but the invention should not be limited thereto. For example, the positive electrode terminal 12 and the negative electrode terminal 13 can also be provided on each of the lateral faces 10d of the electric cell 10 other than the face of the electric cell 10 that sandwiches the power generation element 20 between itself and the bottom face 10b of the electric cell 10.

Besides, in each of the aforementioned first embodiment of the invention and the aforementioned second embodiment of the invention, each of the guide members 50 has been described as a guide portion that supplies the air flowing through the intake path S1 in the X-direction to each of the bottom faces 10b of the case bodies 11a of the electric cells 10 in the direction substantially perpendicular thereto. However, for example, a guide portion that supplies the air flowing along the guide member 50 in the Y-direction to each of the bottom faces 10b of the case bodies 11a of the electric cells 10 from the direction substantially perpendicular thereto can also be adopted. That is, the guide member 50 of each of the present embodiments of the invention is a guide portion that supplies the air supplied to the guide member 50 to each of the bottom faces 10b of the case bodies 11a of the electric cells 10 from the direction substantially perpendicular thereto. The flow direction of the air flowing through the intake path S1 can be appropriately set.

The invention claimed is:

1. A temperature regulation structure, comprising:
a power storage device in which a plurality of power storage elements are arranged side by side in a predetermined direction, wherein each of the power storage elements includes:
a power generation element configured to carry out charging and discharging,
a case body having an opening portion for incorporating the power generation element, the case body accommodating the power generation element, air for temperature regulation is supplied from a direction substantially perpendicular to a bottom face of the case body, and the air coming into contact with each of the power storage elements,
a lid that covers the opening portion of the case body, the bottom face being a face that is opposed to the lid across the power generation element, and
a guide member disposed below the bottom face of the case body having:
a supply passage formed by opposing wall portions configured to guide the air to the bottom face of the case body;
a guide face formed by an upper face of the guide member configured to guide the air flowing in from the supply passage outward along the bottom face to exchange heat with the bottom face, wherein the upper face of the guide member is located below the bottom face of the case body so as to face the bottom face of the case body,
wherein the guide face is spaced apart from the bottom face and extends along a first direction of the bottom face parallel to a longitudinal length of the bottom face, and wherein the supply passage is configured such that a distance between the opposing wall portions in a second direction that is perpendicular to the first direction narrows as a distance to the bottom face decreases; and
wherein an intake path supplies the air to separate, and parallel supply passages of each of the plurality of the power storage elements,
each guide member further includes an exhaust passage partitioned from the supply passage by at least one of the wall portions on opposing sides of the supply passage, the exhaust passage is configured to discharge the air that has exchanged heat with the bottom face,
so that the air that has exchanged heat with the bottom face of each of the power storage elements does not return to the supply passage.

2. The temperature regulation structure according to claim 1, wherein
a first length of each of the power storage elements is shorter than a second length of each of the power storage element,
the first length is a length of each of the power storage elements in a direction in which the lid and the bottom face are opposed to each other, and
the second length is a length of each of the power storage elements in a direction perpendicular to the first length.

3. The temperature regulation structure according to claim 1, wherein
the guide face is configured to guide the air flowing in from the supply passage to exchange heat with the bottom face, toward the exhaust passage along the bottom face.

4. The temperature regulation structure according to claim 3, wherein
the supply passage is configured to guide the air substantially perpendicularly toward the bottom face, and
the exhaust passage is configured to guide the air flowing in via the guide face, in a direction away from the bottom face.

5. The temperature regulation structure according to claim 1, wherein
the supply passage, the guide face, and the exhaust passage are connected to a corresponding bottom face, and
suction and discharge of the air against each of the power storage elements is carried out for each bottom face.

6. The temperature regulation structure according to claim 1, wherein
each of the guide members has an installation portion,
the installation portion contacts with part of the bottom face, and the installation portion is configured to form a space through which the air flows between the guide face and the bottom face.

7. The temperature regulation structure according to claim 1, wherein
the supply passage extends in a length direction of the bottom face of each of the power storage elements that is perpendicular to the predetermined direction, and
the guide face is configured to guide the air exchanging heat with the bottom face of each of the power storage elements, in a width direction of the bottom face that is perpendicular to the length direction, along the bottom face.

8. The temperature regulation structure according to claim 1, wherein
a space between two of the power storage elements that are adjacent to each other in the predetermined direction is filled by an insulating layer.

9. The temperature regulation structure according to claim 1, wherein
each of the lids include an electrode terminal and a valve,
each of the electrode terminals is electrically connected to each of the power generation element, and
each of the valves is configured to discharge gas generated in each of the case bodies to the outside.

* * * * *